United States Patent [19]
Greenblatt

[11] 3,782,814
[45] Jan. 1, 1974

[54] RECHARGEABLE BATTERY PACK FOR PORTABLE CAMERA

[76] Inventor: Louis W. Greenblatt, 12 Ladue Manor, Ladue, Mo. 63124

[22] Filed: May 8, 1972

[21] Appl. No.: 250,977

[52] U.S. Cl............... 352/242, 95/86, 136/173
[51] Int. Cl. ........................................... G03b 17/02
[58] Field of Search............... 136/173; 352/242, 352/243; 95/86; 240/1.3

[56] References Cited
UNITED STATES PATENTS

| | | | |
|---|---|---|---|
| 3,539,253 | 11/1970 | Roppel............................. | 95/86 X |
| 3,653,752 | 4/1972 | Wilson............................ | 352/242 X |
| 3,463,069 | 8/1969 | Kremp............................ | 240/1.3 X |

*Primary Examiner*—Monroe H. Hayes
*Attorney*—Edmund C. Rogers

[57] ABSTRACT

Rechargeable battery pack and mounting arrangement for motion picture cameras comprising a battery pack with an integrally molded plastic casing and slide track with battery terminals molded into the slide track, that track being slideably engageable into a second plastic track element secured to the camera, having plugs connected with wires leading to an external connector for engagement into the camera, the plugs automatically engaging the sockets in the battery pack slide when the battery pack slide is engaged in the second one. The second track may be an intermediate slide constituting a spacer member, and in turn it may have another slide portion that is engageable with a complementary slide member fixed on the camera. A recharger is provided for recharging one or more battery packs at once.

5 Claims, 20 Drawing Figures

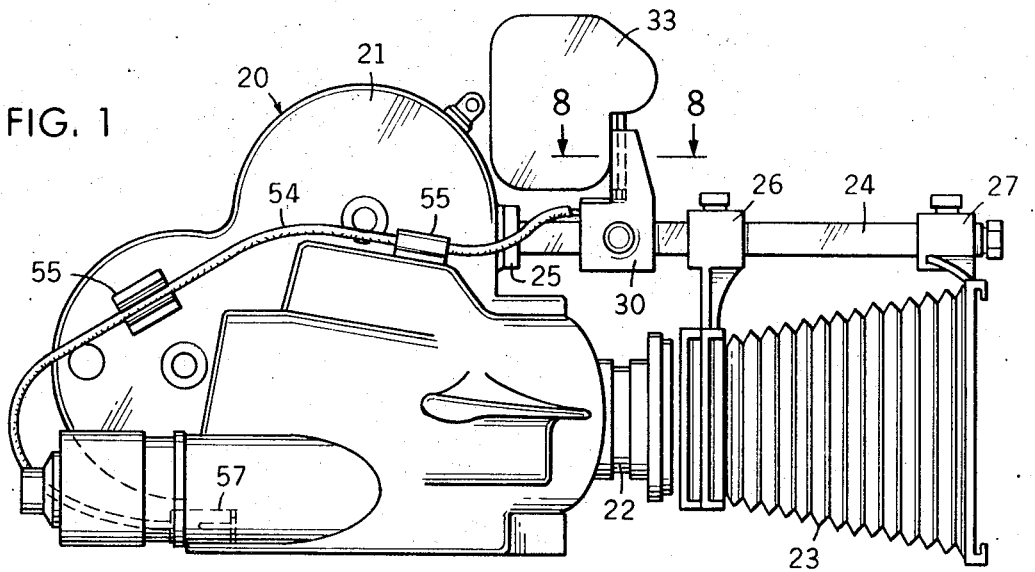
FIG. 1
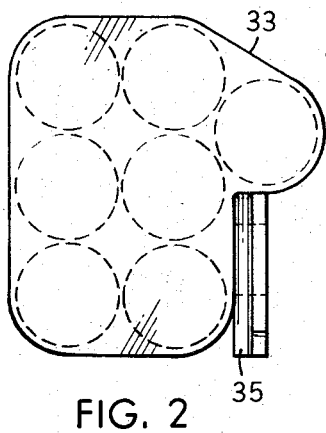
FIG. 2
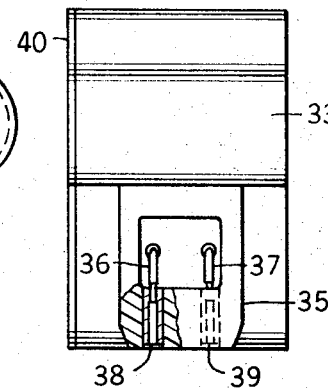
FIG. 3
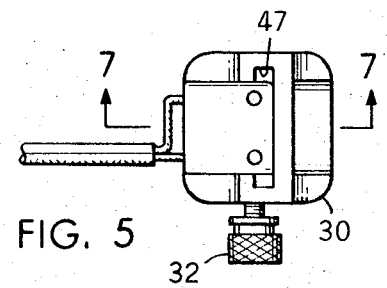
FIG. 5
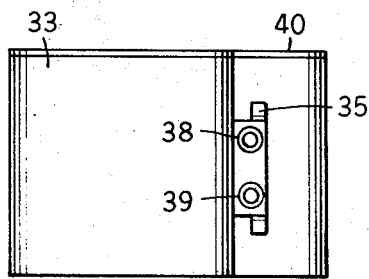
FIG. 4
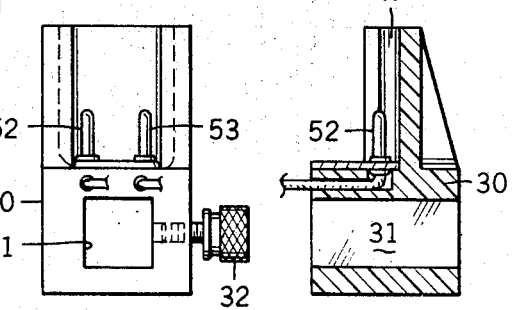
FIG. 6  FIG. 7
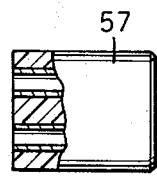
FIG. 8
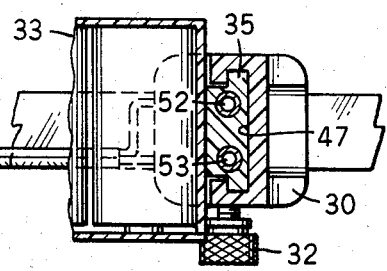

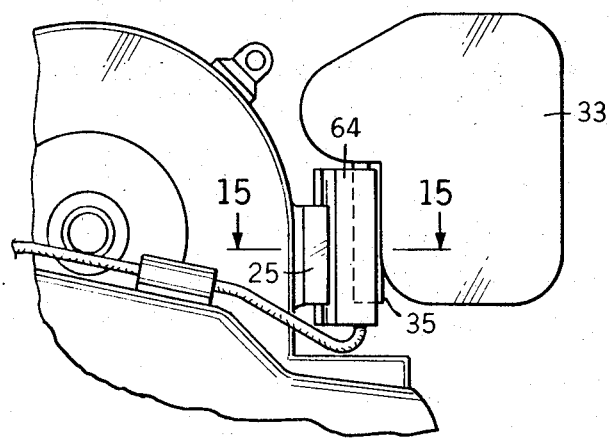
FIG. 9
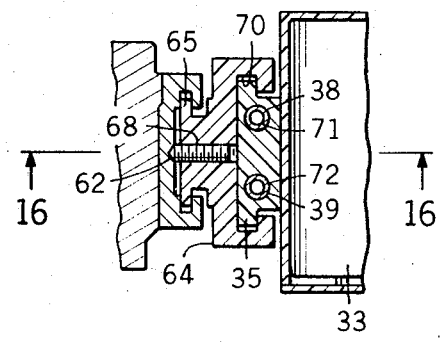
FIG. 15
FIG. 10
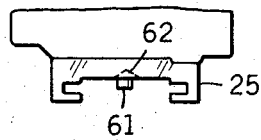
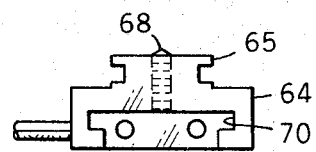
FIG. 12
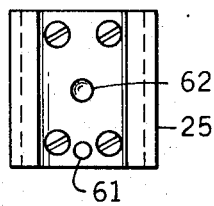
FIG. 11
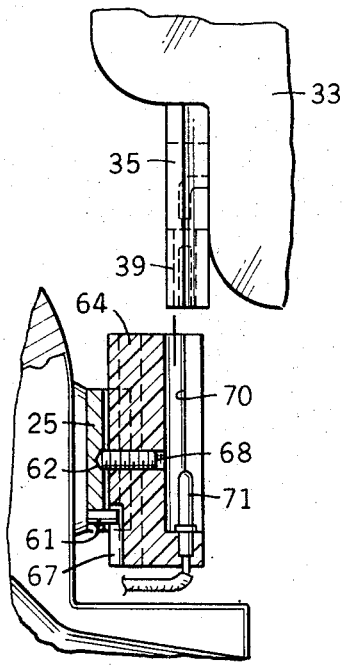
FIG. 16
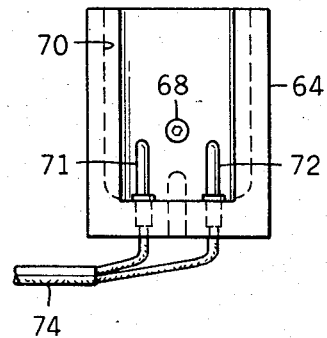
FIG. 13
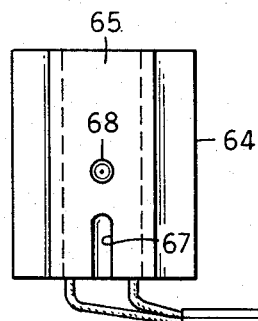
FIG. 14
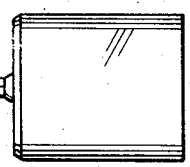

RECHARGEABLE BATTERY PACK FOR PORTABLE CAMERA

BACKGROUND OF THE INVENTION

The problem in some motion picture cameras, particularly the Arriflex used extensively in televison work, is that large battery packs must be carried, usually around the waist of the user and connected by long cables to the camera. With the present invention, a small battery pack can be readily mounted and dismounted on the camera case itself. The battery pack is sized so that it does not interfere with the use of the camera or the sighting thereof. The pack also may be quickly detached so that a substitute pack can be installed if the battery runs down. The batteries are preferably rechargeable and an arrangement is provided by which a recharging mechanism for one or more packs has receptacles that can take the battery packs and also connect directly to the terminals in the slide that is an integral part of the pack, for recharging.

Among the advantages of the present arrangement are that it is small and compact, that it can be readily changed, and that it can be installed and removed without disconnecting any wiring. Also it can be removed from the camera if the older type power pack is desired, and upon removal leaves the camera in its original condition. It is mounted adjacent the forward edge of the upper film reel case, and the same pack with its first slide can be mounted either directly onto the case, or on the bellows extension bar. The battery pack can be enclosed in a molded casing which is light in weight and which also acts as a good protector of the user from disintegrating dry cells. Other advantages will appear from the description to follow.

In the drawings:

FIG. 1 is a side elevation of the camera with the battery pack mounted on the bellows extension bar;

FIG. 2 is a side elevation of the battery pack somewhat enlarged;

FIG. 3 is a view of the battery pack from its right side in FIG. 1, parts being broken away;

FIG. 4 is a bottom view of the battery pack;

FIG. 5 is a top view of the holding bracket for the battery pack;

FIG. 6 is an elevational view of the bracket from the left side in FIG. 1;

FIG. 7 is a vertical front-to-rear medial section of the slide bracket taken on the line 7—7 of FIG. 5;

FIG. 8 is a horizontal section on the line 8—8 of FIG. 1, somewhat enlarged and with the electrical cable connection added;

FIG. 9 is a partial elevation of the camera showing the battery pack mounted in the same general location but on the film reel case;

FIG. 10 is a plan view of the slide bracket on the front of the camera;

FIG. 11 is a front elevation of the slide bracket on the camera;

FIG. 12 is a plan view of the intermediate spacer slide;

FIG. 13 is a view of the intermediate slide from the right side of FIG. 9;

FIG. 14 is a view of the intermediate slide from the left side of FIG. 9;

FIG. 15 is a horizontal section approximately on the line 15—15 of FIG. 9;

FIG. 16 is a vertical section on the line 16—16 of FIG. 15;

DESCRIPTION OF THE PREFERRED EMBODIMENT

Figure 17:
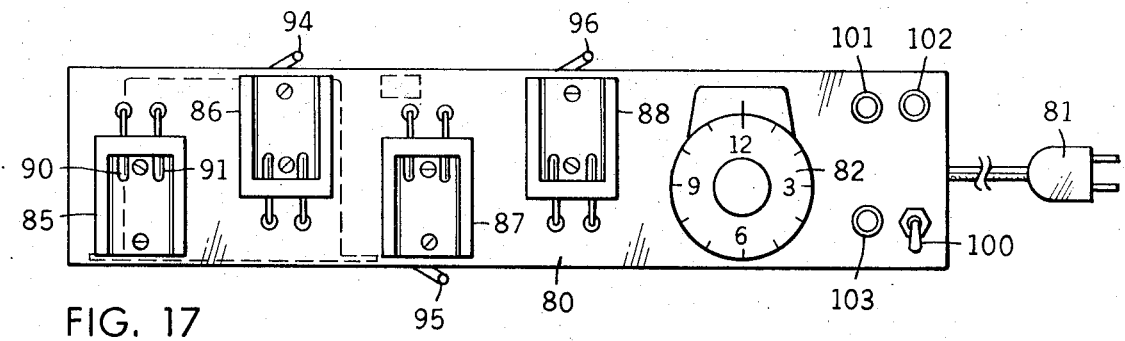
FIG. 17 is a plan view of a charging unit for the battery pack.

FIG. 1 more or less schematically illustrates an outline of an Arriflex camera 20, which is a brand of portable motion picture camera frequently used for films. As illustrated, the camera includes an upper and forward reel spool case 21, a lens tube 22, and in FIG. 1, a bellows 23. This bellows is supported on a square rod 24 mounted in a bracket 25 on the forward edge of the upper reel case 21. As will appear in more detail in connection with a subsequent embodiment, the bar 24 is slideably inserted into the bracket 25. This bar carries a rearward bellows support 26 and a forward bellows support 27, again these components not being part of the present invention.

The present invention includes a slide bracket 30 on the bar 24 for supporting a power pack. The bracket 30 has a squared hole 31 by which it fits slideably but not rotatably over the bar 24, and can be secured in position along the bar by a set screw 32.

The power pack 33 comprises a case designed to enclose several individual rechargeable cells as shown in dotted lines in FIG. 2. The cells are wired together so as to supply adequate electric battery power for operating the camera. The case 33 preferably is of molded non-conductive plastic material which has a first slide 35 integrally formed on it. This slide 35 is T-shaped in cross section as appears in FIG. 8. Negative and positive leads 36 and 37 are introduced and connected into conductive sleeve sockets 38 and 39, that are securely fixed in cylindrical openings in the slide 35, but preferably are set back in the openings to avoid accidental short circuits. In the manufacture of the power pack, there may be a separate cover 40 which is cemented or welded to the remaining plastic of the power pack case after the cells are introduced and the electrical connections made.

The T-shaped primary slide 35 which is a fixed part of the battery pack 33 is, in FIG. 1, slideable into a complementary second slide 47 that is a part of the bracket 30. The slide 47 is vertically disposed so that the first slide 35 on the battery pack can be easily slipped into it for securing the battery pack 33 onto the camera.

Figure 18:
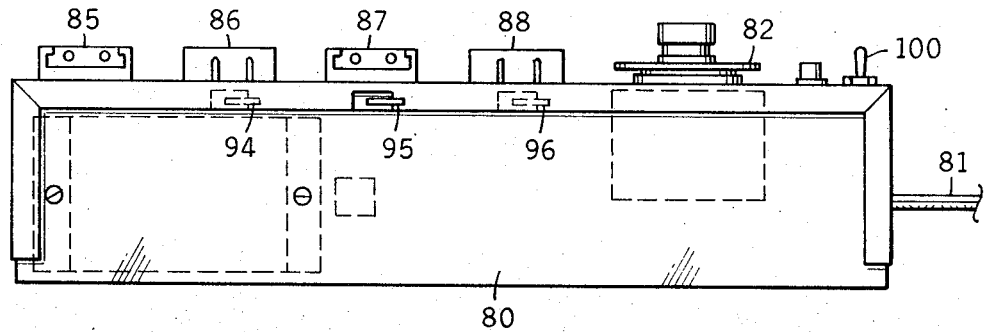
FIG. 18 is an elevation of the charger.

The bracket 30 has two banana plugs 52 and 53 projecting upwardly adjacent the bottom of the slide 47. When the battery pack is fitted to the camera, the slide 35 is slid down in the complementary slide 47 on the bracket 30, bringing the sockets 38 and 39 over and into electrical engagement with the plug connectors 52 and 53, respectively. These banana plug connectors 52 and 53 are connected to a cable 54 in the manner illustrated in FIGS. 1, 5 and 18. This cable 54 passes through appropriate clips 55 on the camera case and leads to a conventional plug connector 57 that connects into a socket at the back of the camera, provided for the purpose of introducing the power into the camera mechanism.

The embodiment of FIGS. 9 through 14 is used when the bellows 23 is not used and the bar 24 is not mounted in the bracket 25. This embodiment employs the same battery pack 33 with its primary slide 35 having the same arrangement of the terminal sockets 38 and 39 to engage over banana plugs as before. In this case, however, the battery pack is supported directly on the slide bracket 25 on the front edge of the camera case. This slide bracket is normally metal and is a female slide. It has a protuberance 61 to limit downward sliding of the complementary male slide on the bar 24. It also has a countersunk recess 62 to receive a set screw as will appear.

Instead of having the first slide 35 of the battery pack 33 directly engage in the slide 25, in this embodiment there is a second, intermediate slide or spacer 64 interposed for the dual purpose of bringing the electrical connections to this part of the camera and for spacing the battery pack forwardly from the camera. The intermediate spacer 64 has a cross section as illustrated in FIG. 15 with its left-hand surface provided with a projecting male slide 65 of T-shaped cross section that is shaped to engage and slide smoothly within the slide of the bracket 25. A groove 67 in this male slide projection 65 permits the slide to pass a predetermined distance over the projection 61. A set screw 68 is threaded through this portion of the second slide to engage within the set screw recess 62 in the slide bracket 25, thereby to secure the intermediate spacer 64 against vertical movement into or out of the bracket 25.

This intermediate spacer 64 also has on its right-hand surface a female slide 70 as shown in FIG. 12. This is sized and shaped to receive the first slide 35 from the battery pack in the same way as does the slide bracket 47. There are two banana plug-electrical connectors 71 and 72 at the bottom of the slide 70 of the intermediate spacer 64 that correspond to the connectors 52 and 53, previously described, and they lead by wires into the cable 74 which corresponds to the cable 54 which in turn leads to the plug connectable into the camera.

USE AND OPERATION

The battery pack 33 with its first slide 35 is a unit of battery power that can readily be attached or detached from the camera in each embodiment here illustrated. In each embodiment, the battery pack 33 is quickly introduced into place by bringing its first slide 35 into the complementary slide that is fixed to the camera at that time, be it the bracket 30 of FIG. 1 or the combination of the intermediate spacer slide 64 and the bracket 25 of FIG. 9. Merely sliding the battery pack 33 into place brings its two socket terminals 38 and 39 down over the two banana plugs 52 and 53, or, alternately, 71 and 72, establishing electrical connection to the cable which normally remains connected into the back of the camera.

It will be noted that the two cylindrical terminals 38 and 39 preferably terminate somewhat inside of the outer ends of the cylindrical holes in which they are mounted in the battery pack slide. This is so that it is less likely that there will be a short circuit of these two terminals by the accidental contact of the battery pack with an electrical conductor. The plastic of the pack itself is nonconductive.

In either case the battery pack is mounted on the front of the camera where it is completely out of the way of the user. Sighting of the camera is not interfered with. Holding of the camera is actually made easier because of the improvement in the balance by having the battery pack mounted forward of the medial transverse axis of the camera.

Normally a user will carry several battery packs when he goes out on an assignment. When he notices that one is exhausted, he quickly removes it, reaches for another and installs it as a substitute. The whole action requires only the very short time necessary for sliding one off its contacts 52, 53 or 70, 71, and out of its slide, and sliding the other into place. The battery pack is little wider than the reel case and is not heavy so it can be carried in the user's pocket or gadget bag, and when in place does not make the camera significantly larger or wider. Furthermore, the parts necessary for this type of battery pack are all quickly removable from the camera so that they can be transferred to a different camera, leaving the original one intact in its original condition. It may be noted that in both embodiments, the battery pack is actually supported on the bracket 25 which is a normal, integral part of the camera.

The batteries here used are the rechargeable type and the present assembly includes a recharging device illustrated in two embodiments in FIGS. 17 through 20. It incorporates an elongated box 80 that contains a transformer, a timing motor, rectifier means, switches and resistors. It is adapted to be connected to a source of 115-volt alternating current by a cord and plug 81. The timer is preferably electrical but may be mechanical. It has a rotatable dial 82 illustrated as being positionable for operation in increments up to 12 hours. Four receptacle slides 85, 86, 87 and 88 are illustrated. As is apparent from the drawings, each of these slides is shaped to receive the complementary slide 35 on each battery pack. The battery packs can be slid into the slides just as they are slid into the slides 47 and 70. Also there are banana plugs 90 and 91 in each slide that make electrical contact into the battery pack when the battery pack is inserted into a slide, all as before.

The slides 86, 87 and 88 also may have switches 94, 95 and 96 positioned so that when a battery pack is inserted into place in such slide, it engages the switch and displaces the same inwardly toward the box 80. As illustrated, the portion of the battery pack that projects out over slide 35 in FIG. 2 will strike the switch and actuate it when the battery pack slide 35 is pressed firmly into the slide.

The box has on its upper surface a main on-and off switch 100, a green light 101 and a red light 102 for purposes to appear.

Figure 19:
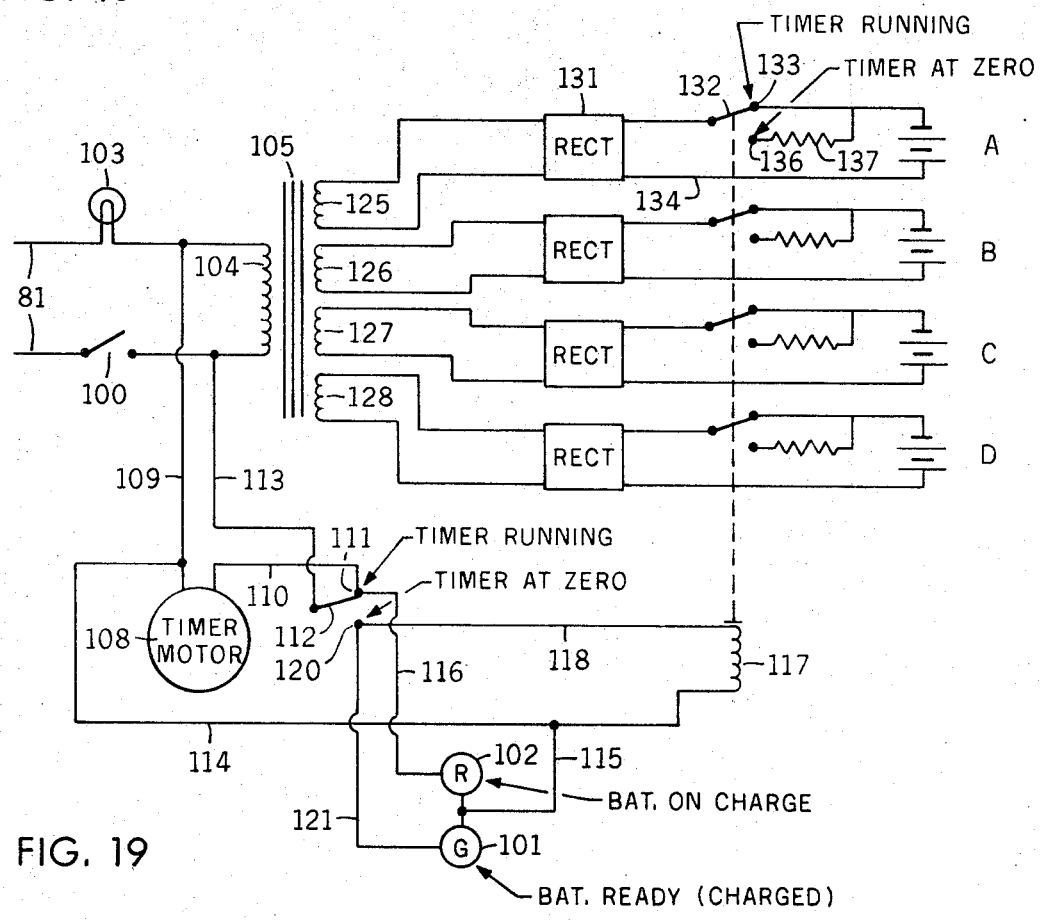
FIG. 19 is a wiring diagram for the charger.

FIG. 19 shows a preferred form of wiring for the charger, which does not require the switches 94–96. Power comes from one of the power lines 81 in through the main switch 100, the primary 104 of a transformer 105, thence through the pilot light 103 to the other wire 81.

The timer is illustrated as having an electric operating motor 108 connected by a wire 109 to one of the wires 81 and by a wire 110 to a "timer-running" terminal 111 of a switch 112, the pole of which is connected by wire 113 to the other power line 81. The wire 109 is also connected by a wire 114 to a wire 115 leading through the red light 102 and thence by a wire 116 to the switch terminal 111. The wire 114 is also connected to the coil 117 of a relay, the other side of which coil is connected by a wire 118 to a second "timer-zero" terminal 120 of the switch 112. The wire 115 also connects through the green light 101, thence by a wire 121 connected to the terminal 120.

The timer motor 108 is in operation whenever the switch 100 is closed and remains running for the length of time set by turning the timer knob 82. Any displacement of the knob 82 causes the switch 112 to close on the contact 111, and when the timer returns to zero, the switch 112 opens with the contact 111 and closes with the contact 120 and remains there.

There are four like battery-charging circuits operating off the four secondary windings 125, 126, 127 and 128, all energized by the primary 104 of the transformer 105. The secondary 125 is connected into a rectifier 131 and rectified voltage is transmitted thence to a first relay switch 132 operated by the relay coil 117. This switch can close with a "timer-running" contact 133, as illustrated, and thence to one of the battery packs 33 in position A, it being understood that battery pack is connected by the banana plugs when it is inserted into its respective slide on the box. The wire 134 connects back from the other banana plug into the rectifier and back to the secondary winding 125.

The switch 132 can also close with the "timer-zero" contact 136 that is connected to a resistor 137 and thence back to the other terminal 133. When the relay coil 117 is energized, which is the case when the timer is at zero, the secondary power is delivered through the rectifier and the switch to the terminal 136 and thence through the resistor 137 before it reaches the battery pack 33. Thus when the timer motor is at zero, the voltage applied to, and current transmitted through, the battery pack 33 are very much reduced to what may be considered a trickle charge. However, when the relay is not energized because the timer is away from its zero position, full power is applied to the battery pack.

It can readily be seen that each battery-charging circuit through the secondaries 126, 127 or 128, operates in the same way as that just described.

Thus the operator may insert one to four battery packs for charging simultaneously. This he does by inserting them into the respective slides on the box and operating the switch 100 into closed position. They can be placed in any of the four positions A through D. He then turns the timer motor away from zero, which causes the switch 112 to switch from the terminal 120 to the terminal 111. This causes the red light 102 to glow, indicating that batteries are on charge. The relay coil 117 is deenergized so that the several switches 132 are in their upper positions, closed with the contacts 133, applying maximum voltage to whatever number of battery packs 33 are thus to be charged.

After the timer has returned from whatever position it was set in, to zero, it returns the switch 112 from the contact 111 to the contact 120. The coil 117 is then energized and the green light 101 caused to glow, the red light being extinguished. Energization of the coil 117 pulls the switches 132 down and puts the resistors 137 in series with the battery packs so that the charging current is sharply reduced. This condition will continue so long as the switch 100 is closed and any battery pack is in place.

If a position is unoccupied by a battery pack, its circuit is not completed because its contacts 90-91 are open. Operation of its relay switch 132 has no effect.

Figure 20:
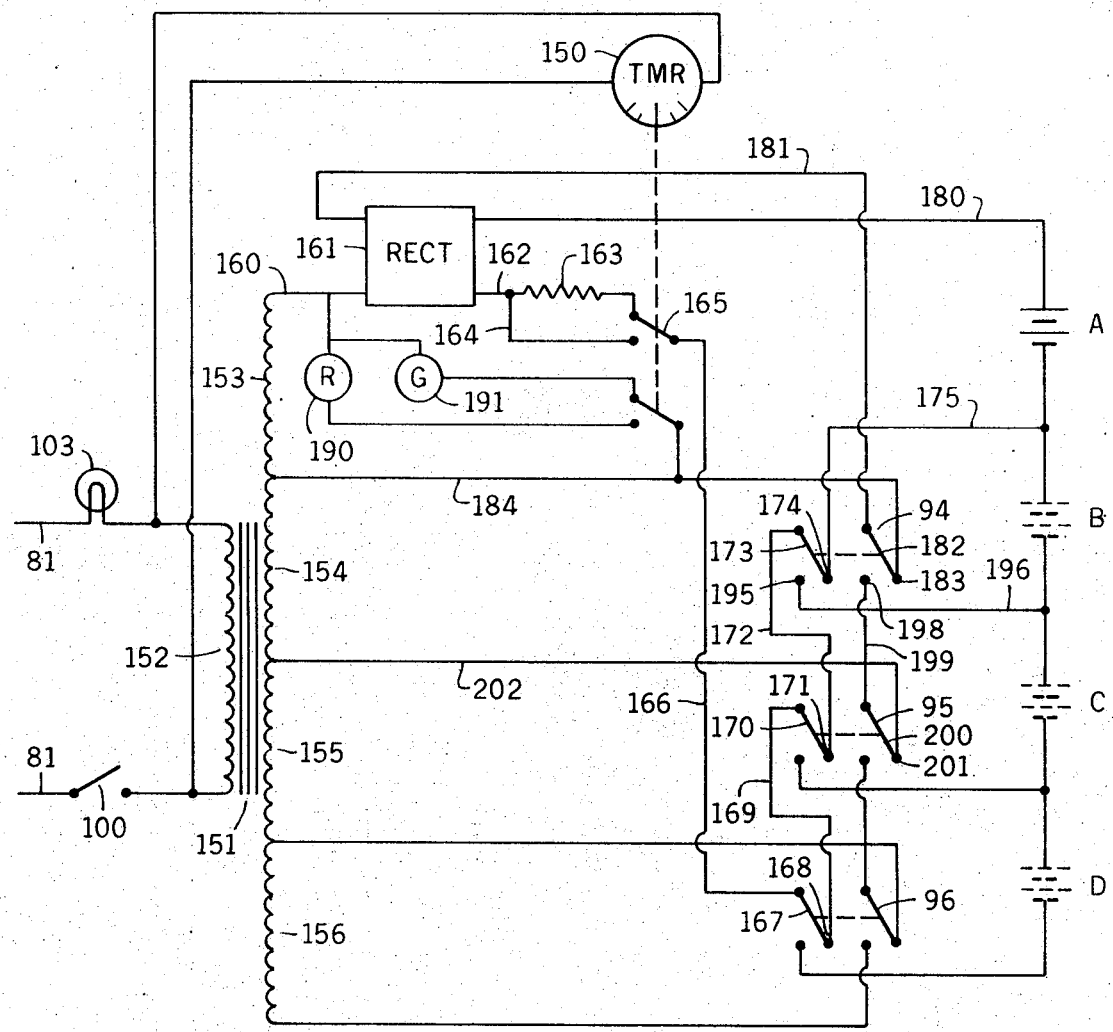
FIG. 20 is an alternate wiring diagram for the charger.

The arrangement in FIG. 20 is an alternate wiring diagram which uses a single rectifier in place of having a rectifier for each one of the secondaries. This circuitry permits the timer motor switch to be operated on the low voltage side. It uses separate switching for each position to bring that position into circuit with the single rectifier.

The power lines 81, the pilot light 103 and the main switch 100 are as before. The timer motor 150 is connected across the power lines subject to the switch 100. The transformer 151 can be the same as before with the primary 152 and four secondaries 153, 154, 155 and 156.

The secondary 153 has a lead 160 connected into a rectifier 161. From the rectifier, a lead 162 connects through a resistor 163 and by a wire 164 to two terminals, respectively, of a switch 165. With a switch in the position illustrated in FIG. 20, the resistor 163 is in circuit. If the switch 165 moves down to the other terminal, the resistor 163 is shunted.

The pole of the switch 165 is connected by a wire 166 to one pole of the switch 96. The switches 94, 95 and 96 are all double pole-double throw switches and are in the positions they occupy when no battery is in any of the positions B, C and D. If a battery is inserted into any of the slides 86, 87 or 88, the corresponding switch 94, 95 or 96 will have both of its poles displaced into their alternate positions as will appear. It may be noted that the setup illustrated in FIG. 20 would provide for the charging of a battery pack in the slide 85.

Thus the line 166 leads to the blade 167 of the switch 96 which is at this time in contact with a terminal 168 connected by a wire 169 to the blade 170 of the switch 95. This switch is in contact with a terminal 171 connected by a wire 172 to the blade 173 of the switch 94, which at this time is in contact with a terminal 174 connected by a wire 175 to one of the two banana plugs for the battery pack A. The circuit passes through the battery pack, thence by the other banana plug 91, and a wire 180 back to the other side of the rectifier 161, through the rectifier and by an AC wire 181 to the blade 182 of the switch 94 now in contact with the terminal 183 which is connected by a wire 184 to a junction between the coils 153 and 154 of the transformer 151. Thus rectified current derived from the single secondary 153 has now passed through the battery pack A. All the other batteries are out of circuit as will be evident.

At this time it is assumed that the timer has been set for a certain number of hours. The timer operates a two-pole switch including the blades 165 and 188. With the timer displaced from zero position, the poles 165 and 188 occupy the alternate positions to those illustrated. This means that the current passing through the battery pack A is not reduced by the resistor 163, which is shunted by the wire 164. Also, a red lamp 190 is put across the secondary winding 153 by the blade 188.

Alternately, as the timer returns to its zero position, the two switch blades 165 and 168 are returned to the positions illustrated, in which case the resistor 163 is put in circuit so that only a trickle charge is applied to the battery pack. Also, the blade 188 now puts the green light 191 across the winding 153 in place of the red light 190.

If two battery packs A and B are both inserted, the battery pack B shifts the switch 94 so that its blades 173 and 182 swing to the left in the drawing. Thereupon, the circuit from the top of the secondary winding 153 passes through the rectifier 161, through the wire 162, and assuming the timer has been moved away from zero position, by the wire 164, the switch 165, the wire 166, the switch 167 which has not been shifted, the wire 169, the switch 170 which has not been shifted, the wire 172, on-and-off blade 173 which is now shifted to close with the alternate contact 195. Thence the circuit continues through the wire 196 that is connected to one of the banana plugs for the battery position B. The circuit continues through the battery pack B, the battery pack A, and the wire 180, back through the rectifier 161 and by the wire 181, switch blade 182 of the switch 94 now shifted to its alternate terminal 198, thence by a wire 199 to the blade 200 of the switch 95 which is closed with the terminal 201 connected by a wire 202 to the other side of the winding 154. Now the two windings 153 and 154 are both in series in circuit applying double voltage for the charging of both battery packs A and B in series. This situation will continue until the timer returns to zero position at which time the resistor 163 is cut back in circuit and a trickle charge is applied to the two battery packs.

Various changes and modifications may be made within this invention as will be readily apparent to those skilled in the art. Such changes and modifications are within the scope and teaching of this invention as defined by the claims appended hereto.

What is claimed is:

1. A battery pack arrangement for a portable electrically operated motion picture camera having a reel case at its upper part and a lens mount at its forward part, the reel case and lens part providing a re-entrant at the upper forward part of the camera having a generally vertical forward edge wall with a vertical attaching bracket thereon, a battery pack having an attaching bracket thereon, means for supporting the battery pack mounted on the vertical attaching bracket of the camera case, including a support means having first attaching means attachable to the attaching bracket on the camera, and having a second attaching means interengageable with the attaching bracket on the battery pack, electrical terminal means on the battery pack and complementary terminal means on the support means, the two terminal means being brought into electrical interengagement when the battery pack bracket is engaged with the second attaching means on the support means and disengaged when the battery pack is disengaged from the support means; and conductor means from the terminal means on the support means to the electrically operated mechanism of the camera.

2. A battery pack arrangement for a portable electrically operable motion picture camera of the type having a narrow case, a lens mount at the forward end of the case, a forwardly facing wall above and behind the lens mount, and a first or attachment connector on the said wall; a battery pack comprising a casing for containing a battery means for operating the camera, separable attaching means for interposition between the battery casing and the camera case, a second connector on the battery pack casing, the attaching means including first portions complementary to and removably interengageable with the second connector, so that the battery casing and attaching means may be connected or disconnected, the attaching means also having second portions complementary to the first or attachment connector on the casing wall and being removably interengageable therewith so that the battery pack may be attached to and removed from the camera case; the battery pack being narrow so that it has at most very little projection laterally of the camera case, and also is compact so that it is encompassed substantially within the forward limits of the lens mount; and electrical connecting means separably interengageable between the battery case and the attaching means, the electrical means being associated with the second connector and the first portions on the attaching means so as to be connected when the second connector and first portions are engaged, and vice versa.

3. The arrangement of claim 2, wherein the separable attaching means includes a support projecting forward from the camera for supporting a camera lens accessory, and the first portions of the attaching means include a member attached to the support to hold the battery pack and having the electrical connection means of the camera for electrical junction with the electrical connection means of the battery pack.

4. The arrangement of claim 2, wherein the second portion of the attaching means includes a slide interengageable with a like slide that constitutes the first connector, and wherein the interengageable slide means are vertical with means to limit downward sliding movement of the battery pack slide means on the camera so that a battery pack may be securely installed by sliding it downward into place.

5. The arrangement of claim 2, wherein the first-named vertical slide is a standard part of the camera and has no electrical connections, and the separable attaching means includes a spacer having first attaching means interengageable with the attaching connector on the camera, and on its opposite side has vertical slide means, the connector on the battery pack having complementary slide means receivable on the slide means of the spacer, and the spacer has electrical connections for interengagement with electrical connections on the battery pack and for connection to the camera.

* * * * *